(12) United States Patent
Yao et al.

(10) Patent No.: US 12,335,982 B2
(45) Date of Patent: Jun. 17, 2025

(54) RADIO (NR) MULTICAST BROADCAST SERVICE (MBS)

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Fangli Xu, Beijing (CN); Haitong Sun, Cupertino, CA (US); Hong He, San Jose, CA (US); Oghenekome Oteri, San Diego, CA (US); Sigen Ye, San Diego, CA (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 373 days.

(21) Appl. No.: 17/818,426

(22) Filed: Aug. 9, 2022

(65) Prior Publication Data
US 2023/0044542 A1    Feb. 9, 2023

Related U.S. Application Data

(63) Continuation of application No. 17/759,874, filed as application No. PCT/CN2021/111051 on Aug. 5, 2021.

(51) Int. Cl.
*H04W 72/30* (2023.01)

(52) U.S. Cl.
CPC .................................. *H04W 72/30* (2023.01)

(58) Field of Classification Search
CPC ... H04W 72/30; H04W 72/232; H04W 76/27; H04W 76/40
See application file for complete search history.

(56) References Cited

U.S. PATENT DOCUMENTS

| 2021/0259044 A1* | 8/2021 | Islam | H04W 52/0229 |
| 2023/0362959 A1* | 11/2023 | Latheef | H04L 5/0044 |

FOREIGN PATENT DOCUMENTS

| EP | 3337199 | 6/2018 |
| WO | 2014/065997 | 5/2014 |

OTHER PUBLICATIONS

Kyocera, SC-MCCH change notifications and SC-MTCH suspension/resumption, Feb. 13-17, 2017, 3GPP TSG-RAN WG2 #97, R2-1701672, pp. 1-10 (Year: 2017).*
CMCC, Discussion on delivery mode 2 remaining issues, Apr. 12-Apr. 20, 2021, 3GPP TSG-RAN WG2 Meeting #113, R2-2103704, pp. 1-6 (Year: 2021).*

(Continued)

*Primary Examiner* — Farid Seyedvosoghi
(74) *Attorney, Agent, or Firm* — Fay Kaplun & Marcin, LLP

(57) ABSTRACT

A user equipment (UE) is configured to receive physical uplink control channel (PUCCH) configuration information associated with PUCCH resource allocation for negative acknowledgement (NACK)-only based hybrid automatic repeat request (HARQ)-acknowledgement (ACK) feedback for multicast broadcast service (MBS), receive a signal from a base station and transmit HARQ-ACK feedback to the base station in response to the signal.

18 Claims, 8 Drawing Sheets

(56) References Cited

OTHER PUBLICATIONS

CMCC, "Discussion on delivery mode 2 remaining issues", 3GPP TSG RAN WG2 Meeting #113b-e, R2-2103704, Apr. 2, 2021, 6 sheets.

Kyocera, "SC-MCCH change notifications and SC-MTCH suspension/resumption", 3GPP TSG RAN WG2 #97, R2-1701672, Feb. 12, 2017, 10 sheets.

Moderator (BBC), "Feature lead summary #1 on RAN basic functions for broadcast/multicast for UEs in RRC_IDLE/ RRC_INACTIVE states"; 3GPP TSG RAN WG1 #105-e, R1-2105993, May 10-27, 2021, 41 sheets.

\* cited by examiner

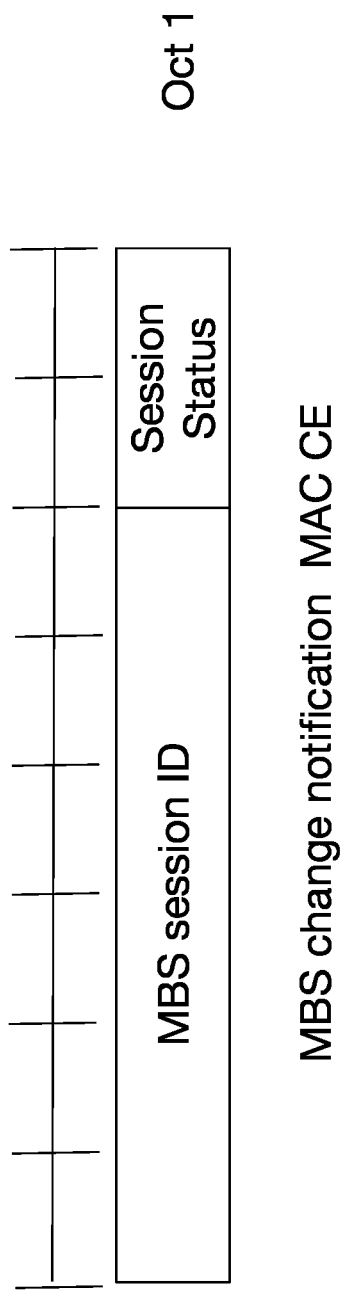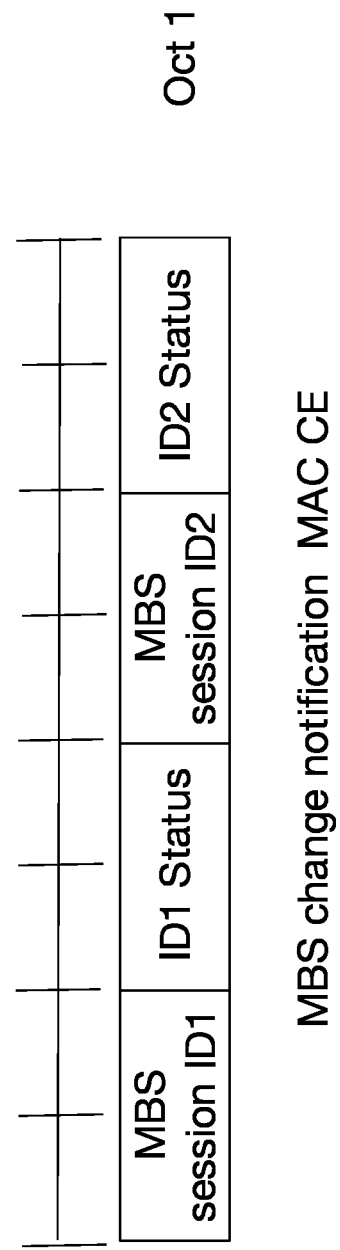
Fig. 8

RADIO (NR) MULTICAST BROADCAST SERVICE (MBS)

TECHNICAL FIELD

This application relates generally to wireless communication systems, and in particular relates to New Radio (NR) Multicast Broadcast Service (MBS).

A Fifth Generation (5G) New Radio (NR) network may support unicast and multicast services. Multicast refers to a point-to-multipoint communication scheme where the same data is transmitted from a single source to multiple endpoints at the same time. In contrast to multicast, unicast refers to a point-to-point communication scheme where data is transmitted from a source to a single endpoint. A user equipment (UE) may be configured to receive data via unicast and/or multicast when connected to the 5G NR network.

SUMMARY

Some exemplary embodiments are related to a processor of a user equipment (UE) configured to perform operations. The operations include receiving physical uplink control channel (PUCCH) configuration information associated with PUCCH resource allocation for negative acknowledgement (NACK)-only based hybrid automatic repeat request (HARQ)-acknowledgement (ACK) feedback for multicast broadcast service (MBS), receiving a signal from a base station and transmitting HARQ-ACK feedback to the base station in response to the signal.

Other exemplary embodiments are related to a processor of a base station configured to perform operations. The operations include receiving user equipment (UE) capability information from a UE, the UE capability information indicating that the UE supports negative acknowledgement (NACK)-only based hybrid automatic repeat request (HARQ)-acknowledgement (ACK) feedback for multicast broadcast service (MBS), configuring the UE with a first set of PUCCH resources for NACK-only based HARQ-ACK feedback, configuring the UE with a second set of PUCCH resources for ACK/NACK based HARQ-ACK feedback and receiving HARQ-ACK feedback from the UE.

Still further exemplary embodiments are related to a processor of a user equipment (UE) configured to perform operations. The operations include monitoring a multicast broadcast service (MBS) control channel (MCCH) during a radio resource control (RRC) idle state or a RRC inactive state and identifying a MCCH change notification, the MCCH change notification indicating a modification to an MBS traffic channel (MTCH).

BRIEF DESCRIPTION OF THE DRAWINGS

FIG. 8 shows two examples of a medium access control (MAC) control element (CE) structure that may be used for MBS change notification according to various exemplary embodiments.

DETAILED DESCRIPTION

Figure 1:
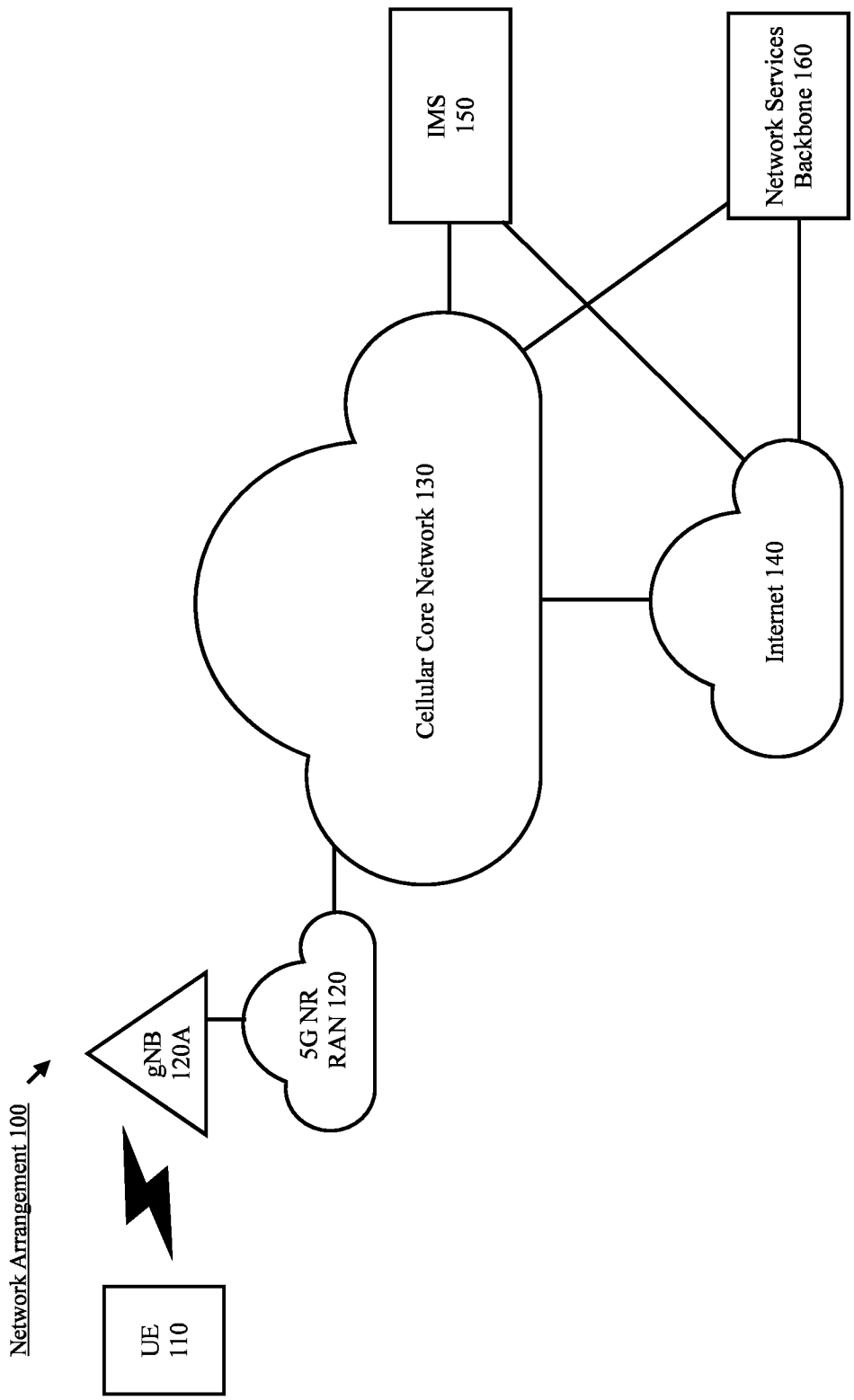
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to Multicast Broadcast Service (MBS) for Fifth Generation (5G) New Radio (NR). As will be described in more detail below, in one aspect, the exemplary embodiments introduce techniques to support negative acknowledgement (NACK)-only based hybrid automatic repeat request (HARQ)-acknowledgement (ACK) feedback for MBS. In another aspect, the exemplary embodiments introduce techniques to support a multicast control channel (MCCH) change notification mechanism.

MBS generally refers to a feature of 5G NR where the same content is delivered to multiple recipients. Throughout this description examples of MBS functionality are described with regard to multicast. Multicast refers to a point-to-multipoint communication scheme where data is delivered from a single source to multiple endpoints at the same time. However, reference to multicast service is merely provided for illustrative purposes, those skilled in the art will understand that the exemplary concepts described herein are also applicable to broadcast service.

The exemplary embodiments are also described with regard to an MBS session. Throughout this description, the term "MBS session" may refer to a communication session that is configured to deliver data to the UE via multicast. To provide an example, the MBS session may include an MBS bearer. Similar to the function of a packet data unit (PDU) session, the MBS bearer may deliver data from a source to the UE through the 5G NR network. Any reference to an MBS session or an MBS bearer is merely provided for illustrative purposes. Different entities may refer to similar concepts by a different name.

A 5G NR network may also deliver data via unicast. In contrast to multicast, unicast refers to a point-to-point communication scheme where data is transmitted from a source to a single endpoint. However, any reference to a unicast or a unicast session is merely provided for illustrative purposes. Different entities may refer to similar concepts by different names.

As mentioned above, in one aspect, the exemplary embodiments introduce techniques configured to support NACK-only based HARQ-ACK feedback for MBS. HARQ generally refers to a signaling exchange in which information and/or data is sent from a transmitting device to a receiving device and in response, feedback is provided to the transmitting device. The exemplary embodiments relate to scenarios in which the UE is the receiving device and a base station is the transmitting device.

HARQ-ACK feedback may be characterized as an acknowledgement (ACK) or a negative acknowledgement (NACK). An ACK may indicate that the information and/or data was successfully received by the receiving device (e.g., the UE). A NACK may indicate that the information and/or data was not successfully received by the receiving device. For example, the UE may provide NACK feedback when a transmission is not received or the UE is unable to decode at least a portion of the contents of the transmission. However, reference to two types of HARQ-ACK feedback (ACK, NACK) is merely provided for illustrative purposes. Additional types of HARQ-ACK feedback may be utilized and different entities may refer to similar concepts by different names.

The exemplary embodiments are described with regard to two different types of HARQ-ACK feedback mechanisms for MBS, e.g., "NACK-only based HARQ-ACK feedback" and "ACK/NACK based HARQ-ACK feedback." NACK-only based HARQ-ACK feedback refers to a mechanism where the UE provides NACK feedback if the UE does not receive a transmission or the UE was unable to decode at least a portion of the contents of the transmission. However, if the UE successfully receives the transmission, the UE does not provide any HARQ-ACK feedback. ACK/NACK based HARQ-ACK feedback refers to a mechanism where the UE provides ACK feedback if the UE successfully received a transmission and NACK feedback if the UE does not receive a transmission or the UE was unable to decode at least a portion of the contents of the transmission.

The exemplary embodiments also include techniques for physical uplink control channel (PUCCH) resource allocation for HARQ-ACK feedback in a network that supports both ACK/NACK based HARQ-ACK feedback and NACK-only based HARQ-ACK feedback for MBS. In addition, the exemplary embodiments include techniques to support NACK-only based HARQ-ACK feedback for MBS in a network that supports both ACK/NACK based HARQ-ACK feedback and NACK-only based HARQ-ACK feedback. These exemplary techniques may be used in conjunction with other currently implemented HARQ-ACK feedback techniques and procedures for MBS, future implementations of HARQ-ACK feedback techniques and procedures for MBS or independently from other HARQ-ACK feedback techniques and procedures for MBS.

In another aspect, the exemplary embodiments relate to a MCCH change notification mechanism for radio resource control (RRC) idle or RRC inactive UEs. Those skilled in the art will understand that when the MCCH gets modified due to a session start, the network may provide the UE with an explicit notification of the change (e.g., MCCH change notification). The exemplary embodiments include techniques for utilizing a dedicated radio network temporary identifier (RNTI) to scramble the cyclic redundancy check (CRC) of downlink control information (DCI) indicating a MCCH change notification. In addition, the exemplary embodiments include techniques for utilizing a DCI format scheduling a MCCH without a dedicated RNTI for indicating a MCCH change notification. These exemplary techniques may be used in conjunction with other currently implemented MCCH change notification mechanisms, future implementations of MCCH change notification mechanisms or independently from other MCCH change notification mechanisms.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., the next generation Node B (gNB) 120A.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
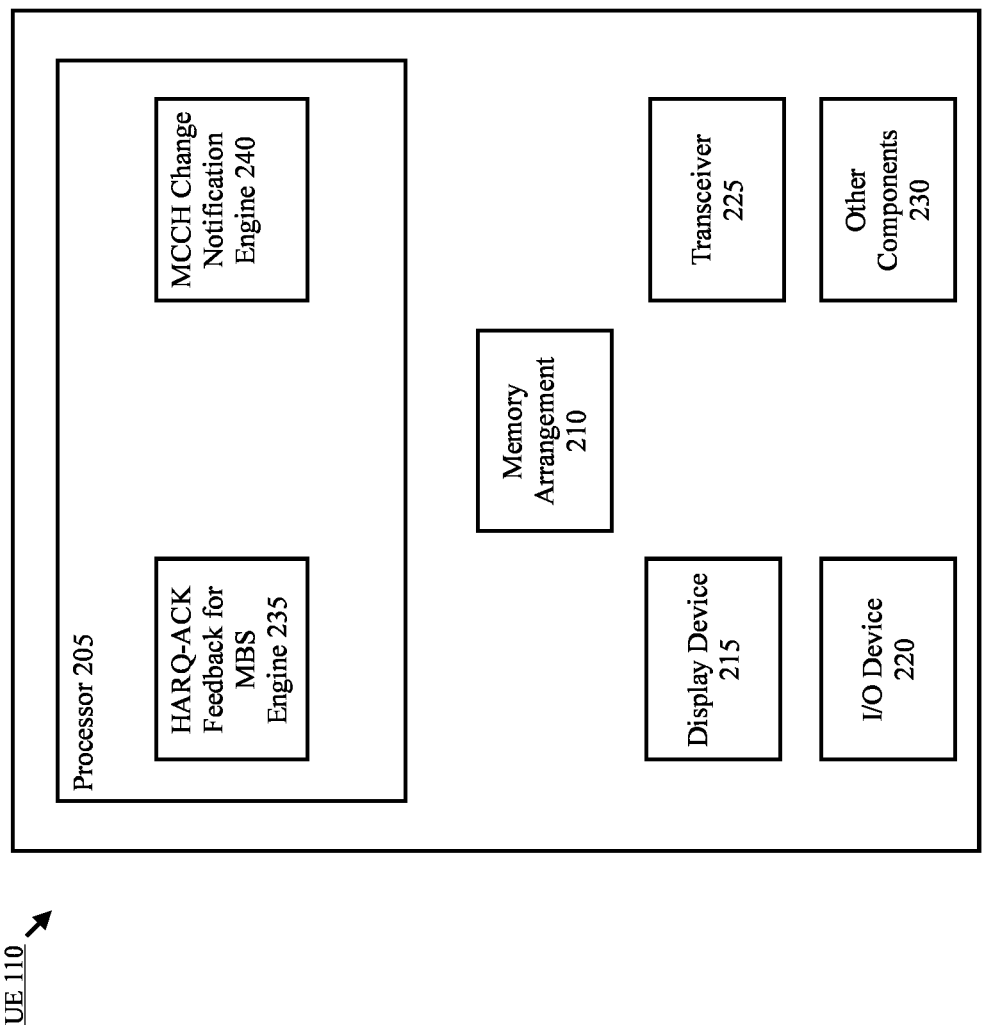
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include an HARQ-ACK feedback for MBS engine 235 and a MCCH change notification engine 240. The HARQ-ACK feedback for MBS engine 235 may perform various operations related to the UE 110 providing HARQ-ACK feedback to the network including, but not limited to, transmitting capability information, determining whether to utilize NACK-only based HARQ-ACK feedback or ACK/NACK based HARQ-ACK feedback during an MBS session and selecting PUCCH resources for HARQ-ACK feedback. The MCCH change notification engine 240 may perform various operations related to the MCCH such as, but not limited to, receiving a MCCH change notification.

The above referenced engines 235, 240 being applications (e.g., a program) executed by the processor 205 is merely provided for illustrative purposes. The functionality associated with the engines 235, 240 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
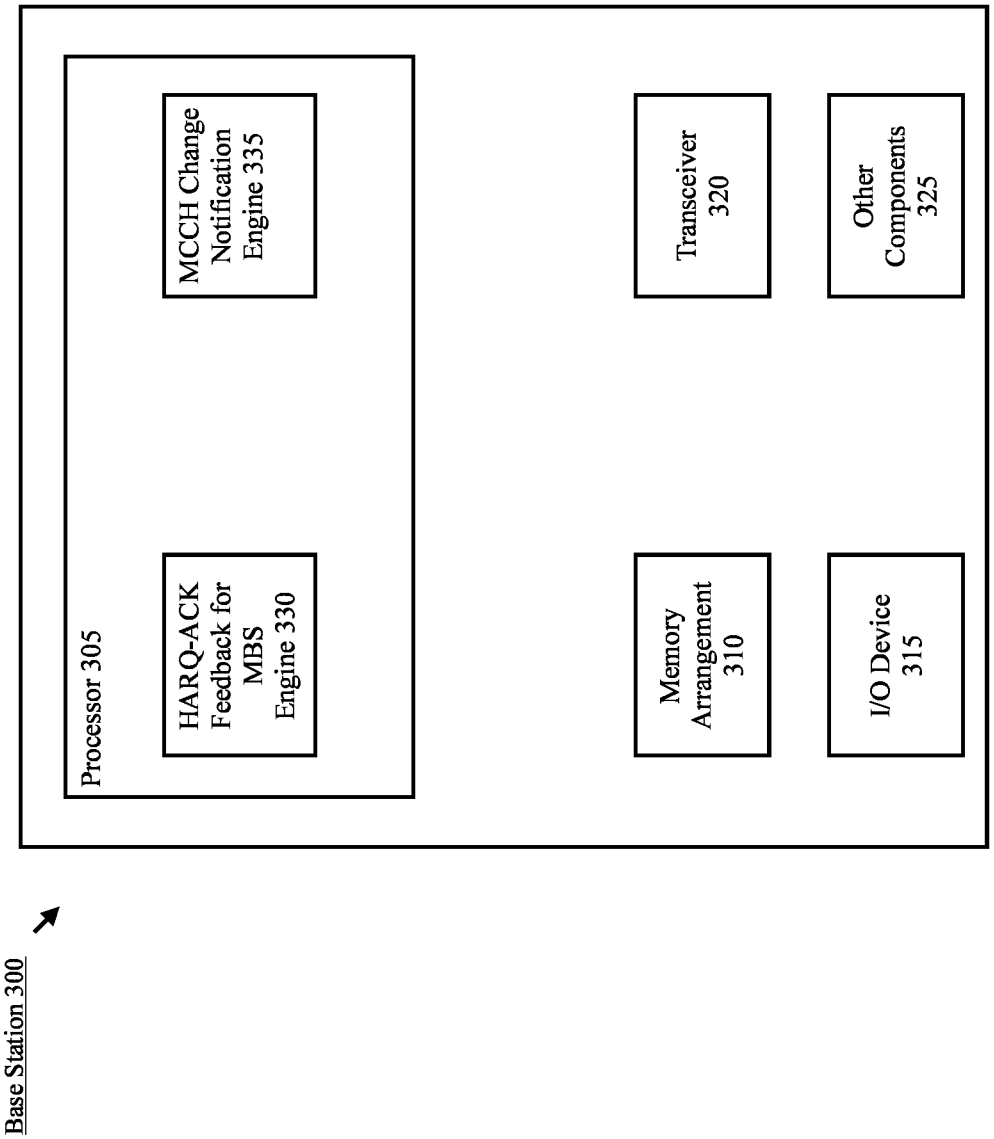
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320, and other components 325. The other components 325 may include, for example, an audio input device, an audio output device, a battery, a data acquisition device, ports to electrically connect the base station 300 to other electronic devices, etc.

The processor 305 may be configured to execute a plurality of engines of the base station 300. For example, the engines may include an HARQ-ACK feedback for MBS engine 330 and a MCCH change notification engine 335. The HARQ-ACK feedback for MBS engine 330 may perform various operations related to the UE 110 providing HARQ-ACK feedback to the network such as, but not limited to, receiving capability information and allocating PUCCH resources for HARQ-ACK feedback. The MCCH change notification engine 335 may perform various operations related to the MCCH such as, but not limited to, transmitting a MCCH change notification to the UE 110.

The above noted engines 330, 335 each being an application (e.g., a program) executed by the processor 305 is only exemplary. The functionality associated with the engines 330, 335 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the system 100. The transceiver 320 may operate on a variety of different frequencies or channels (e.g., set of consecutive frequencies). Therefore, the transceiver 320 may include one or more components (e.g., radios) to enable the data exchange with the various networks and UEs.

In one aspect, the exemplary embodiments relate to HARQ-ACK feedback for MBS. Those skilled in the art will understand that an RRC connected UE configured to receive multicast service may support ACK/NACK based HARQ-ACK feedback and/or NACK-only based HARQ-ACK feedback. As will be described in more detail below the exemplary embodiments include techniques for PUCCH resource allocation for HARQ-ACK feedback in a network that supports both ACK/NACK based HARQ-ACK feedback and NACK-only based HARQ-ACK feedback for MBS. In addition, the exemplary embodiments include techniques to support NACK-only based HARQ-ACK feedback for MBS in a network that supports both ACK/NACK based HARQ-ACK feedback and NACK-only based HARQ-ACK feedback.

Figure 4:
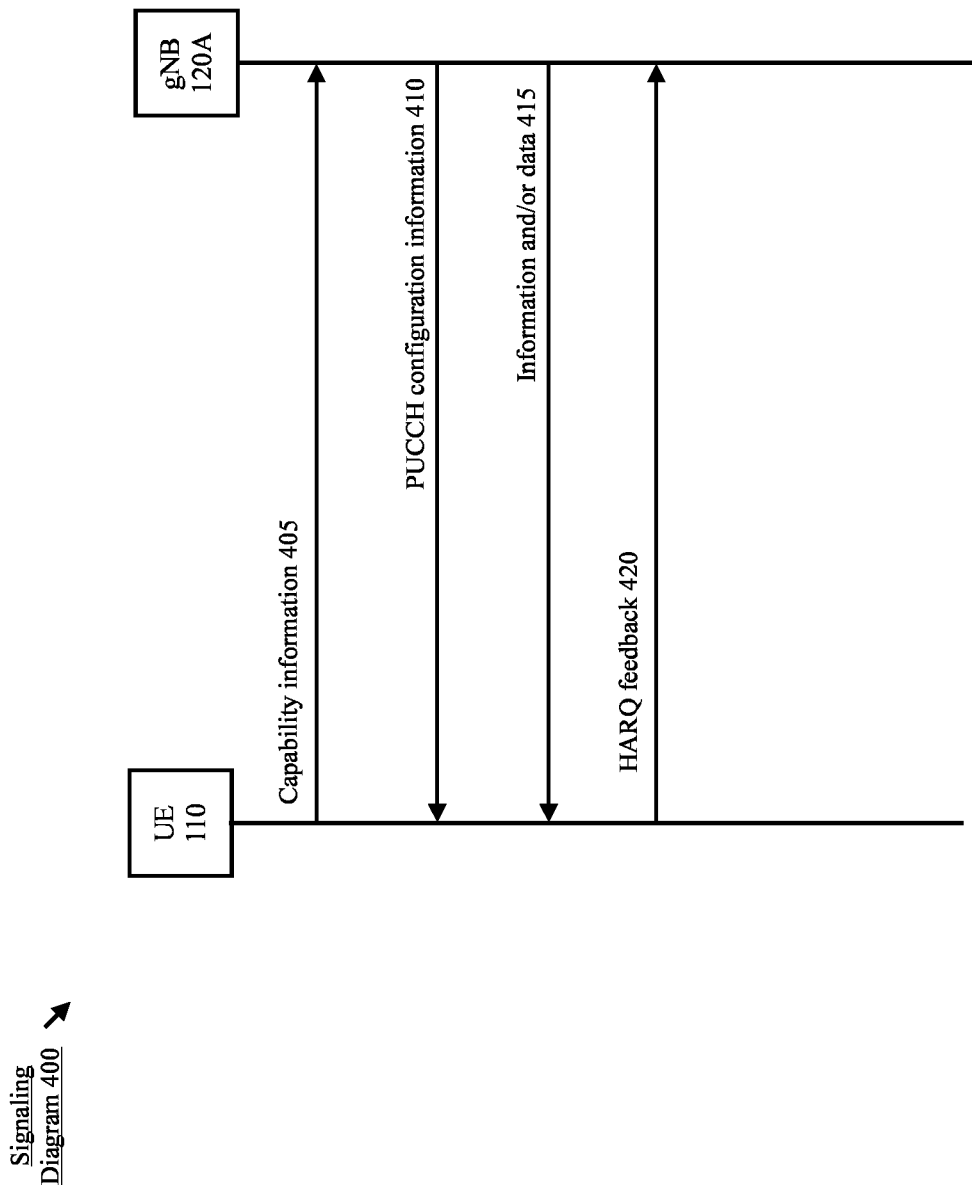
FIG. 4 shows a signaling diagram for physical uplink control channel (PUCCH) resource configuration when PUCCH resources are UE specific according to various exemplary embodiments.

In one approach, PUCCH resource allocation for HARQ-ACK feedback may be UE specific. FIG. 4 shows a signaling diagram 400 for PUCCH resource configuration for multicast when PUCCH resources are UE specific. The signaling diagram 400 includes the UE 110 and the gNB 120A.

In 405, the UE 110 may transmit capability information to the gNB 120A. The capability information may indicate to the network the type of HARQ feedback supported by the UE 110 for multicast (e.g., ACK/NACK based HARQ-ACK feedback or NACK-only HARQ-ACK feedback). However, reference to capability information is merely provided for illustrative purposes. The exemplary embodiments may apply to this type of indication being provided to the network in any appropriate explicit or implicit manner.

In 410, the UE 110 receives PUCCH configuration information from the gNB 120A. The PUCCH configuration information may indicate to the UE 110 the PUCCH resource allocation for HARQ-ACK feedback for MBS.

In one example, the exemplary embodiments introduce a "PUCCH-ConfigurationList" for MBS that is separate and distinct from the PUCCH-ConfigurationList for unicast. Those skilled in the art will understand that the PUCCH-configurationList is an RRC parameter providing a PUCCH configuration for one or more HARQ-ACK codebooks. However, reference to the term "PUCCH-Configuration-List" is merely provided for illustrative purposes. Different networks may refer to a similar concept by a different name.

The PUCCH-ConfigurationList for MBS may be shared between ACK/NACK based HARQ-ACK feedback mode and NACK-only based HARQ-ACK feedback. Thus, when the UE 110 supports both types of HARQ feedback, this single parameter may be applied to both procedures. In some embodiments, NACK-only based HARQ-ACK feedback is supported for both high priority and low priority MBS services. In other embodiments, NACK-only based HARQ-ACK feedback only supports low priority MBS services.

In another example, the exemplary embodiments introduce two PUCCH-ConfigurationList(s) for MBS HARQ-ACK feedback. A first PUCCH-configurationList specific to ACK/NACK based HARQ-ACK feedback for MBS and a second different PUCCH-ConfigurationList specific to NACK-only based HARQ-ACK feedback for MBS. Thus, in this example, the UE 110 may receive three different PUCCH-ConfigurationList parameters, e.g., one for unicast HARQ/ACK feedback and two for multicast HARQ/ACK feedback.

Alternatively, in another example, the unicast PUCCH resources for HARQ-ACK feedback may be shared with the multicast resources for HARQ-ACK feedback, e.g., NACK-only based HARQ-ACK feedback for MBS and/or ACK/NACK based HARQ-ACK feedback for MBS. In this example, the PUCCH-ConfigurationList for unicast may also apply for multicast and thus, a new RRC parameter may not need to be introduced.

In 415, the gNB 120A transmits information and/or data to the UE 110. The UE 110 may be configured to respond to this transmission with HARQ feedback. In 420, the UE 110 transmits HARQ feedback to the gNB 120A. The UE 110 may identify the PUCCH resources allocated for each service and type of HARQ feedback (e.g., ACK/NACK, NACK-only) using the PUCCH-ConfigurationList parameters referenced above.

If the transmission in 415 was part of a unicast session, the HARQ feedback may be transmitted over the PUCCH using the PUCCH resources allocated for unicast. If the transmission in 415 was part of a MBS session, the HARQ feedback may be transmitted over the PUCCH using the PUCCH resources allocated for multicast. However, as indicated above, for the NACK-only based HARQ-ACK feedback the UE 110 may not transmit feedback if the transmission in 415 was successfully received and may transmit NACK feedback if the transmission in 415 was not successfully received.

In another approach, PUCCH resource allocation for NACK-only based HARQ-ACK feedback may be common to a group of UEs. For example, PUCCH resources for NACK-only based HARQ-ACK feedback may be shared by a group of UEs subscribed to different MBS sessions. The PUCCH resources for the group of UEs may be configured within an uplink common frequency resource (CFR). As will be described in more detail below, the association between an order of HARQ-ACK bits in the time domain, MBS sessions and the PUCCH resources may be defined to enable the use of common PUCCH resources for a group of UEs utilizing NACK-only based HARQ-ACK feedback for MBS.

The network may support PUCCH format 0 and PUCCH format 1 for NACK-only based HARQ-ACK feedback for MBS. The indication of the physical resource block (PRB) for PUCCH format 0 and PUCCH format 1 may be provided to the UE 110. In one example, the PRB may be indicated by a PRB offset value defined relative to point A. Those skilled in the art will understand that "point A" is configured by absolute frequency via SIB1 (e.g., absolute radio frequency channel number (ARFCN) and represents a lowest subcarrier of a lowest common resource block (RB). In another example, the PRB may be indicated by a PRB offset value defined relative to a starting PRB of the dedicated unicast bandwidth part (BWP).

Figure 5:
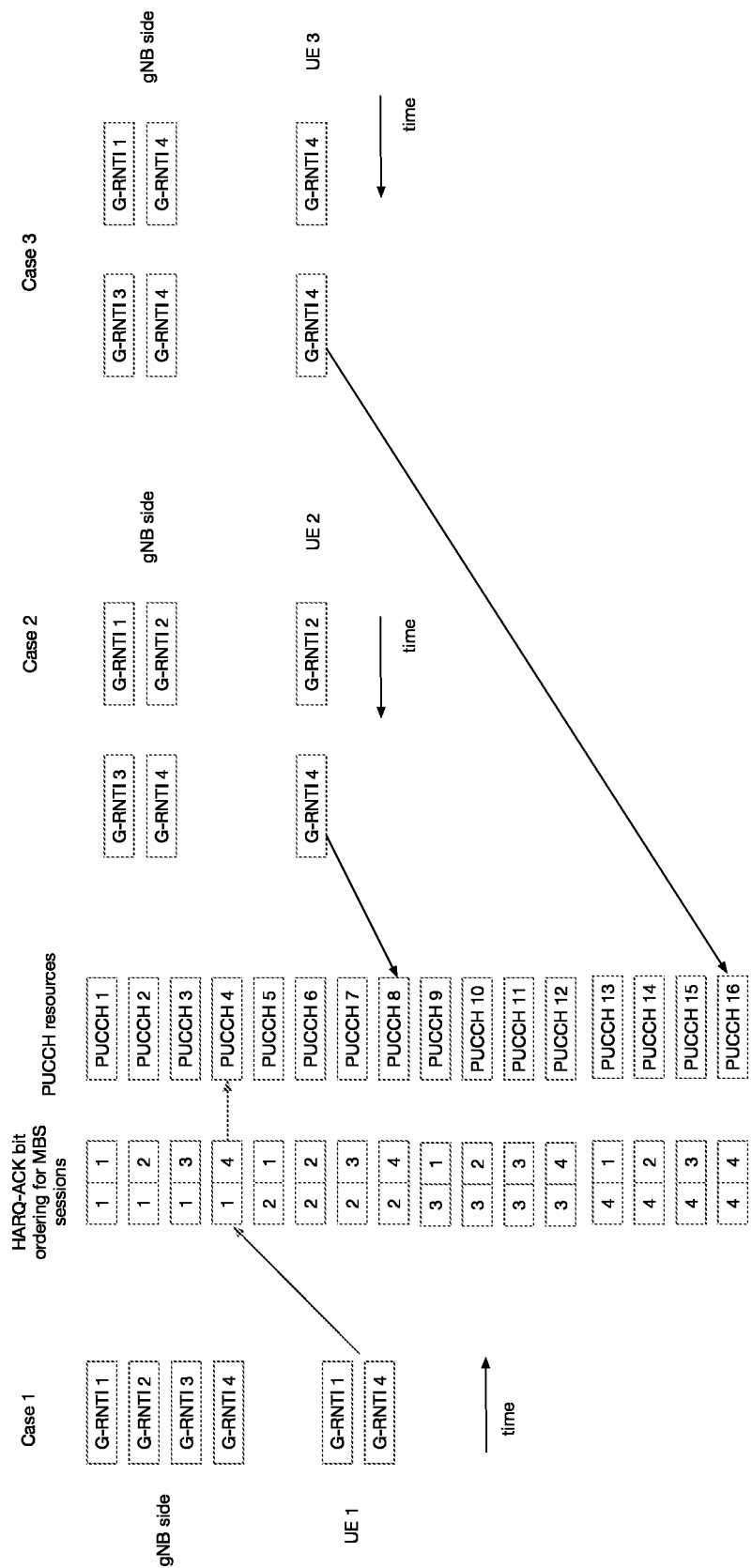
FIG. 5 shows examples of PUCCH resources allocation when PUCCH resources for negative acknowledgement (NACK)-only based hybrid automatic repeat request (HARQ)-acknowledgement (ACK) feedback is shared among UEs within a group UEs according to various exemplary embodiments.

When PUCCH resources for HARQ-ACK feedback are shared among UEs within the group, the PUCCH resources used for feedback by a particular UE may depend on the one or more subscribed MBS sessions and corresponding multicast physical downlink shared channel (PDSCH) scheduled by the network. FIG. 5 shows examples of PUCCH resources allocation when PUCCH resources for NACK-only based HARQ-ACK feedback are shared among UEs within a group UEs.

When the PUCCH resource allocation is common to a group of UEs, a particular UE may select a PUCCH resource associated with one or more subscribed MBS sessions from a PUCCH resource pool to report the HARQ-ACK feedback. The PUCCH resource pool may be represented by (N*N) where (N) is a number of MBS sessions available at a base station. In the examples shown in FIG. 5, 4 MBS sessions are available and each PUCCH resource may carry 2 HARQ-ACK bits. Thus, N=4 and the number of PUCCH resources is 16 (e.g., 4*4=16). In addition, each MBS session may be associated with one group (G)-RNTI. In FIG. 5, G-RNTI 1 is associated with MBS session 1, G-RNTI 2 is associated with MBS session 2, G-RNTI 3 is associated with MBS session 3 and G-RNTI 4 is associated with MBS session 4.

In FIG. 5, there is a predefined association between G-RNTI, MBS sessions and PUCCH resources. When the UE 110 determines the order in the time domain of the PDSCH for its subscribed one or more MBS sessions, the UE 110 may identify the PUCCH resource for the HARQ-ACK feedback based on the association between PUCCH resources and an order of HARQ-ACK bits in response to the PDSCH.

For case 1, UE 1 may be subscribed to MBS session 1 and MBS session 4. The scheduled PDSCH for MBS session 1 and PDSCH for MBS session 4 are multiplexed in a frequency division multiplex (FDM) manner and arranged in ascending order in the frequency domain. In this example, the HARQ-ACK bit ordering comprises the HARQ-ACK bit for MBS session 1 ordered first in the time domain and the HARQ-ACK bit for session 4 ordered second in the time domain. Based on the predefined association between the order of HARQ-ACK bits for MBS session 1 and MBS session 4, the UE 1 knows that PUCCH resource 4 is to be used for HARQ-ACK feedback by UE 1. Three HARQ statuses may be reported using PUCCH resource 4, e.g., i) HARQ bit value for MBS session 1=0 and HARQ bit value for MBS session 4=0, ii) HARQ bit value for MBS session 1-0 and HARQ bit value for MBS session 4=2, and iii) HARQ bit value for MBS session 1=1 and HARQ bit value for MBS session 4=0.

For case 2, MBS sessions are multiplexed in a time division multiplex (TDM) manner. In this example, UE 2 is subscribed to MBS session 2 and MBS session 4. In addition, the PDSCH of MBS session 2 is scheduled first in time and the PDSCH of MBS session 4 is scheduled second in time. Thus, the order of the HARQ-ACK bits is the HARQ-ACK bits for MBS session 2 and then the HARQ-ACK bits for MBS session 4. There is a predefined association for this order of HARQ-ACK bits to PUCCH resource 8.

For case 3, MBS sessions are multiplexed in a TDM manner. In this example, UE 3 is subscribed to MBS session 4. Thus, in the HARQ-ACK feedback window, two instances of PDSCH reception for MBS session 4 are scheduled. Thus, the order of the HARQ-ACK bits is two HARQ-ACK bits for MBS session 4. There is a predefined association for this order of HARQ-ACK bits to PUCCH resource 16.

In some embodiments, a downlink assignment index (DAI) may be introduced for MBS DCI. For example, a counter DAI or a total DAI parameter may be used to track the order of the HARQ-ACK bits per MBS session. For example, if the UE 110 is configured with G-RNTI 1 and G-RNTI 2, the DAI is separately counted for each corresponding MBS session. The UE 110 may calculate the HARQ-ACK bit number based on the value of the corresponding DAIs.

As indicated above, the UE 110 may be configured to support both NACK-only based HARQ-ACK feedback and ACK/NACK based HARQ-ACK feedback. In one approach, the use of ACK/NACK feedback may be independent from the use of NACK-only feedback. With this approach, if the number of bits required for NACK-only based HARQ-ACK feedback is beyond a PUCCH payload size (e.g., 3 bits, etc.), the UE 110 may drop the HARQ-ACK transmission. However, in some embodiments, the UE 110 does not expect the number of HARQ-ACK bits to be larger than the PUCCH payload size.

In another approach, if the UE 110 supports NACK-only based HARQ feedback, the UE 110 also supports ACK/NACK based HARQ-ACK feedback. Thus, if the number of bits required for NACK-only based HARQ-ACK feedback is beyond a PUCCH payload size (e.g., 3 bits, etc.), the UE 110 may utilize the ACK/NACK based HARQ-ACK feedback procedure.

Figure 6:
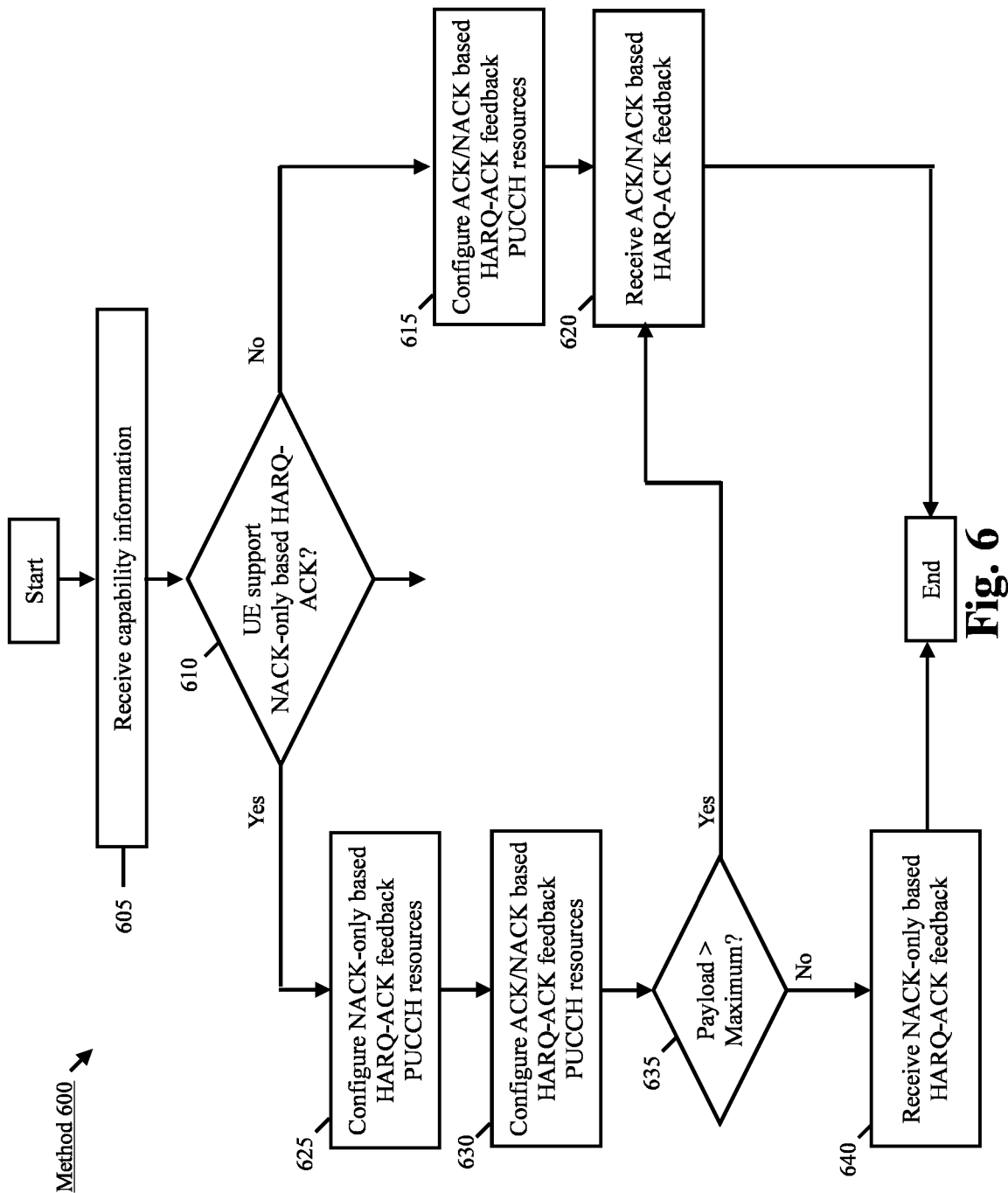
FIG. 6 shows a method for configuring PUCCH resources at a UE configured with both NACK-only based HARQ feedback and ACK/NACK based HARQ-ACK feedback for multicast broadcast service (MBS) according to various exemplary embodiments.

FIG. 6 shows a method 600 for configuring PUCCH resources at a UE configured with both NACK-only based HARQ feedback and ACK/NACK based HARQ-ACK feedback for MBS. The method 600 is described from the perspective of the gNB 120A configuring PUCCH resources for the UE 110.

In 605, the gNB 120A receives capability information from the UE 110. The capability information may indicate whether the UE 110 supports NACK-only based HARQ-ACK feedback.

In 610, the gNB 120A determines whether the UE 110 supports NACK-only based HARQ-ACK feedback. In this example, if the UE 110 supports NACK-only based HARQ-ACK feedback it is assumed that the UE 110 also supports ACK/NACK base HARQ-ACK feedback. If the UE 110 does not support NACK-only based HARQ-ACK feedback, the method 600 continues to 615. In 615, the gNB 120A configures the UE 110 with ACK/NACK based HARQ-ACK feedback PUCCH resources. In 620, the gNB 120A receives ACK/NACK based HARQ-ACK feedback.

Returning to 610, If the UE 110 supports NACK-only based HARQ-ACK feedback, the method 600 continues to 625. In 625, the gNB 120A configures the UE 110 with NACK-only based HARQ-ACK feedback PUCCH resources. In 630, the gNB 120A configures the UE 110 with ACK/NACK based HARQ-ACK feedback PUCCH resources.

In 635, if HARQ-ACK feedback is scheduled to have a payload size larger than a maximum value for the NACK-only based HARQ-ACK PUCCH resources (e.g., 2 bits, etc.), the method 600 continues to 620. In 620, the gNB 120A receives ACK/NACK based HARQ-ACK feedback. At the UE 110, the UE 110 may determine that the payload size for the HARQ-feedback is to exceed the maximum value. Thus, the UE 110 switches to ACK/NACK based feedback and utilizes the assigned PUCCH resources for the ACK/NACK based feedback.

Returning to 635, if the payload size is less than or equal to the maximum value, the method 600 continues to 640. In 640, the gNB 120A receives NACK-only based HARQ-ACK feedback. At the UE 110, the UE 110 may determine that the payload size for the HARQ-feedback does not exceed the maximum value. Thus, the UE 110 reports HARQ feedback using PUCCH format 0 or PUCCH format 1 with the PUCCH resources for NACK-only based HARQ-ACK feedback.

In some embodiments, a PUCCH resource indication (PRI) field may be utilized in DCI. During operation, if the UE 110 is to report HARQ feedback for NACK-only based HARQ-ACK feedback and the number of bits to be reported is less than or equal to a maximum value (e.g., 2 bits), the PRI field in the DCI may be ignored by the UE 110. Instead, the UE 110 may determine the PUCCH resource for reporting the HARQ-ACK bits using the techniques described above with regard to FIG. 5. However, if the UE 110 is to report HARQ feedback for NACK-only based HARQ-ACK feedback and the number of bits to be reported is greater than 2 or the UE 110 is to report ACK/NACK based HARQ-ACK feedback, the PRI in the DCI may indicate the PUCCH resource for the HARQ-ACK feedback. This PRI may be provided by physical downlink control channel (PDCCH) for unicast or multicast PDSCH.

In another aspect, the exemplary embodiments relate to a MCCH change notification mechanism for RRC idle or RRC inactive UEs. Those skilled in the art will understand that when the MCCH gets modified due to a session start, the network may provide the UE 110 with an explicit notification of the change (e.g., MCCH change notification). As will be described in more detail below, the exemplary embodiments include techniques for utilizing a dedicated RNTI to scramble the CRC of DCI indicating a MCCH change notification. In addition, the exemplary embodiments include techniques for utilizing a DCI format scheduling a MCCH without a dedicated RNTI for indicating a MCCH change notification.

For UEs not in RRC connected state, control information may be periodically transmitted via MCCH. The UE 110 may apply the control information transmitted via the MCCH to a configuration for an MBS traffic channel (MTCH). Each MTCH may correspond to an MBS session available at the base station. When a MCCH notification is received, this may indicate to the UE 110 that for a duration of time (e.g., MCCH modification period) there is a change on the MTCH configuration. For example, during a first time window, the MTCH for MBS session 1 and MTCH for MBS session 2 is scheduled. At the end of the first time window, MCCH change indication may be received over the MCCH. The MCCH change indication may indicate that during a second time window, there is a different MTCH configuration. For example, the MTCH for MBS session 1 and MTCH for MBS session 2 may be configured in a different manner during the second time window, a MTCH for MBS session 3 may be configured for the second time window and/or the MTCH for MBS session 1 or MBS session 2 may not be configured during the second time window.

Figure 7:
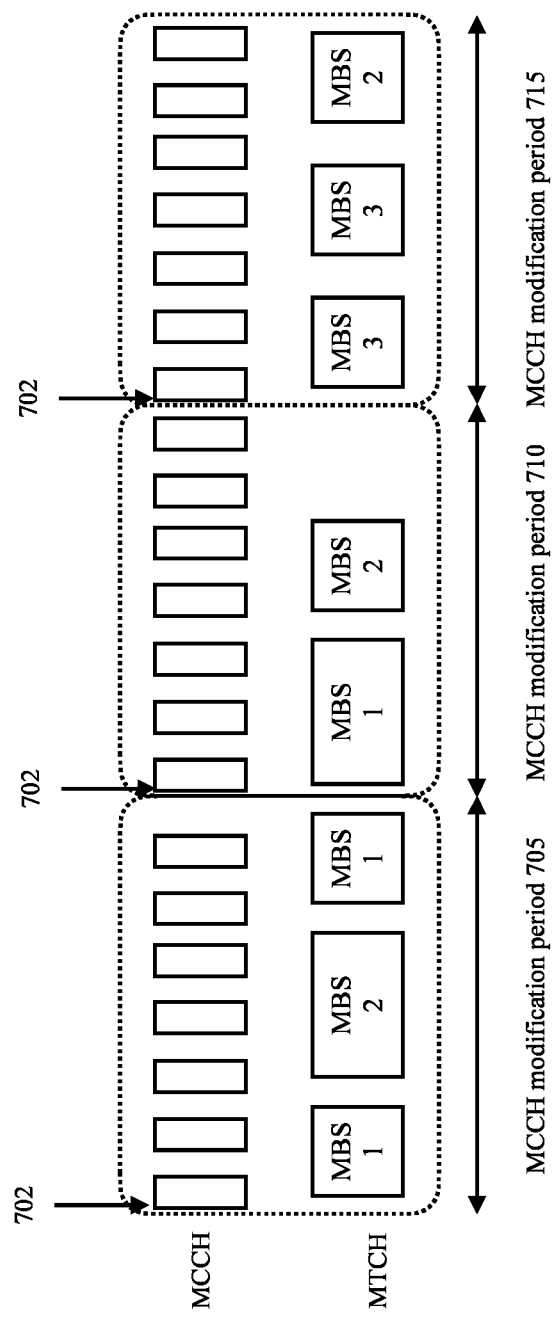
FIG. 7 shows an example of the relationship between multicast control channel (MCCH) and MBS traffic channel (MTCH) according to various exemplary embodiments.

FIG. 7 shows an example of the relationship between MCCH and MTCH. FIG. 7 shows three MCCH modification periods 705-715. In this example, at the beginning of each MCCH modification period 705-715 a MCCH change indication 702 is received. FIG. 7 shows that within each MCCH modification period there is a different MTCH configuration. MCCH modification period 705 comprises MTCH for MBS session 1 and MBS session 2. MCCH modification period 710 also comprises MTCH for MBS session 1 and MBS session 2. However, compared to MCCH modification period 705, the MTCH for MBS session 1 and MTCH for MBS session 2 is arranged differently within MCCH modification period 710. MCCH modification period 715 comprises MTCH for MBS session 3 and does not include any MTCH for MBS session 1 or MBS session 2. The different configuration may be indicated to the UE 110 via the MCCH change notification.

As indicated above, a dedicated RNTI to scramble CRC of a DCI may be used to indicate a MCCH change notification. In some embodiments, a new DCI format may be introduced for MCCH change notification. Throughout this description, this new DCI may be referred to as DCI 2_x. However, reference to DCI 2_x is merely provided for illustrative purposes, the 2_x classification provided herein may serve as a placeholder. In an actual deployment scenario, the new DCI format may be assigned any appropriate number or label.

The DCI format 2_x may be configured with CRC scrambled by MCCH change notification RNTI (e.g., MC-RNTI). This DCI may include (Y) fields corresponding to (Y) number of MBS sessions. Each MBS session field may include (Z) number of bits. In some embodiments, (Z) is fixed as 1 bit or 2 bits. In other embodiments, (Z) is dynamic and may be indicated by RRC signaling. The value of a first bit may indicate whether an MBS session has started or not and a value of a second but may indicate whether an MBS session has stopped or not. For example, within the context of FIG. 7, the MCCH change notification 702 received prior to MCCH modification period 705 include a bit indicating that MBS session 1 has started, a bit indicating that MBS session 2 has start and a bit indicated that MBS session 3 has not started. The MCCH change notification 702 received prior to MCCH modification period 715 include a bit indicating that MBS session 1 has stopped, a bit indicating that MBS session 2 has stopped and a bit indicated that MBS session 3 has started.

Alternatively, an existing DCI format may be used for the MCCH change notification. For example, DCI format 2_0 with CRC scrambled by MC-RNTI may be used. However, for either DCI format 2_x or DCI format 2_0, the size of the DCI for MCCH change notification indication may be treated as "1" in DCI size budget (e.g., DCI scrambled with RNTI used for a specific purposes (not cell (C)-RNTI)).

In another approach, a field in a DCI format scheduling MCCH without a dedicated RNTI for MCCH change notification may be utilized. In this approach, a new field may be introduced in DCI for MCCH. For example, in DCI format 1_0 a new field for MCCH may be introduce. In some embodiments, the MCCH change notification field may be introduced in DCI for all MBS sessions.

The new field may be (a)*N bits where (a) is a number of bits for an MBS session and N is a number of MBS sessions. N may be a fixed value (e.g., maximum number of supported MBS sessions) or configurable by the gNB. In some embodiments, (a) may be a fixed value and (a) set to a first value may indicate an MBS session start and (a) set to a second value may indicate an MBS session stop. In other embodiments, (a) may be dynamic and configured by RRC signaling. In some embodiments, the new field may be (a)*N+1 bits, where the additional bit may be used to indicate that all MBS sessions have been terminated.

In some embodiments, the new field in DCI may only be used in the first instance of MCCH during the MCCH modification period. Thus, as shown in FIG. 7, the MCCH 702 may include the new DCI field described above. In other embodiments, the new DCI field may be included in each instance of MCCH. Thus, within the context of FIG. 7, the new DCI field may be included in each MCCH and not just the MCCH 702. In other embodiments, the MCCH change notification field in DCI may be applicable to a group of MBS sessions. Thus, the first MCCH received in a MCCH modification period may be applicable to a first set of MBS sessions (B), the second MCCH received in the MCCH modification period may be applicable to a second set of MBS sessions (e.g., B+1 to 2B). The following instance of MCCH for the MCCH modification period may follow the same rule (e.g., 2B+1 to 3B, etc.).

In another approach, a medium access control (MAC) control element (CE) may be introduced in a MAC packet data unit (PDU) for MCCH change notification. The MAC CE may indicate a MCCH change notification without impacting the DCI format size. With this MAC CE, one MBS session field includes the MBS session ID and a session status (e.g., start MBS session, stop MBS session, etc.). The MAC CE may be introduced in the first PDCCH in the MCCH modification period or in every PDCCH in the modification period. FIG. 8 shows two examples of a MAC CE structure that may be used for MBS change notification. This approach may be beneficial because from a DCI size perspective and MBS session capacity consider, the UE 110 does not need to decode additional DCI.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A processor of a user equipment (UE) configured to perform operations comprising:
    monitoring a multicast broadcast service (MBS) control channel (MCCH) during a radio resource control (RRC) idle state or a RRC inactive state; and
    identifying a MCCH change notification, the MCCH change notification indicating a modification to an MBS traffic channel (MTCH), wherein the MCCH change notification is provided by a downlink control information (DCI) format without a dedicated radio network temporary identifier (RNTI) for indicating the MCCH change notification.

2. The processor of claim 1, wherein the MCCH change notification is provided by a value of a DCI field, wherein a first value is associated with an MBS session start and a second value is associated with an MBS session stop.

3. The processor of claim 1, wherein the MCCH change notification is provided by a value of a DCI field, wherein a first value is associated with a first group of MBS sessions and a second value is associated with a second different group of MBS sessions.

4. The processor of claim 1, wherein the MCCH change notification is provided by a value of a DCI field.

5. The processor of claim 4, wherein the MCCH change notification is for a group of MBS sessions.

6. The processor of claim 4, wherein the DCI field comprises 2 bits.

7. A user equipment (UE), comprising:
    a transceiver configured to communicate with a network; and
    a processor communicatively coupled to the transceiver and configured to perform operations comprising:
        monitoring a multicast broadcast service (MBS) control channel (MCCH) during a radio resource control (RRC) idle state or a RRC inactive state; and
        identifying a MCCH change notification, the MCCH change notification indicating a modification to an MBS traffic channel (MTCH), wherein the MCCH change notification is provided by a downlink control information (DCI) format without a dedicated radio network temporary identifier (RNTI) for indicating the MCCH change notification.

8. The UE of claim 7, wherein the MCCH change notification is provided by a value of a DCI field, wherein a first value is associated with an MBS session start and a second value is associated with an MBS session stop.

9. The UE of claim 7, wherein the MCCH change notification is provided by a value of a DCI field, wherein a first value is associated with a first group of MBS sessions and a second value is associated with a second different group of MBS sessions.

10. The UE of claim 7, wherein the MCCH change notification is provided by a value of a DCI field.

11. The UE of claim 10, wherein the MCCH change notification is for a group of MBS sessions.

12. The UE of claim 10, wherein the DCI field comprises 2 bits.

13. A processor of a base station configured to perform operations comprising:
    determining a multicast broadcast service (MBS) control channel (MCCH) change notification indicating a modification to an MBS traffic channel (MTCH); and
    generating, for transmission, the MCCH change notification on a multicast broadcast service (MBS) control channel (MCCH), wherein the MCCH change notification is transmitted via a downlink control information (DCI) format without a dedicated radio network temporary identifier (RNTI) for indicating the MCCH change notification.

14. The processor of claim 13, wherein the MCCH change notification is provided by a value of a DCI field, wherein a first value is associated with an MBS session start and a second value is associated with an MBS session stop.

15. The processor of claim 13, wherein the MCCH change notification is provided by a value of a DCI field, wherein a first value is associated with a first group of MBS sessions and a second value is associated with a second different group of MBS sessions.

16. The processor of claim 13, wherein the MCCH change notification is provided by a value of a DCI field.

17. The processor of claim 16, wherein the MCCH change notification is for a group of MBS sessions.

18. The processor of claim 16, wherein the DCI field comprises 2 bits.

* * * * *